Jan. 8, 1935.  R. L. WALSH  1,986,867
AIRPLANE PROPELLER
Filed Feb. 13, 1932  3 Sheets-Sheet 1
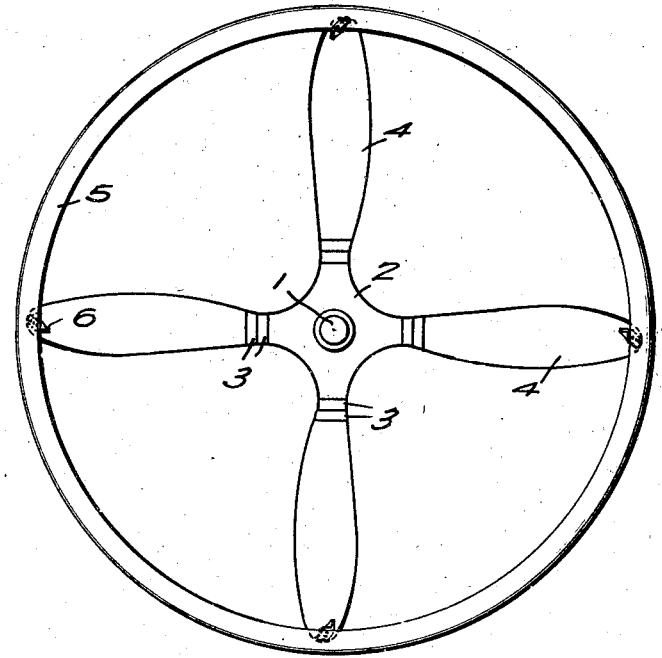
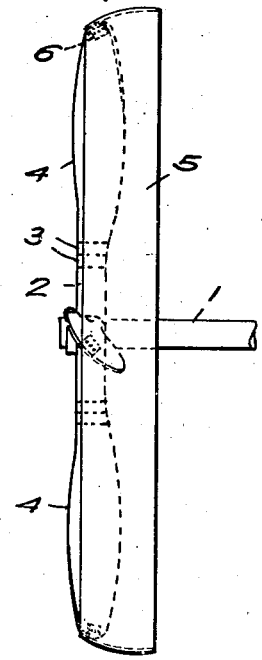
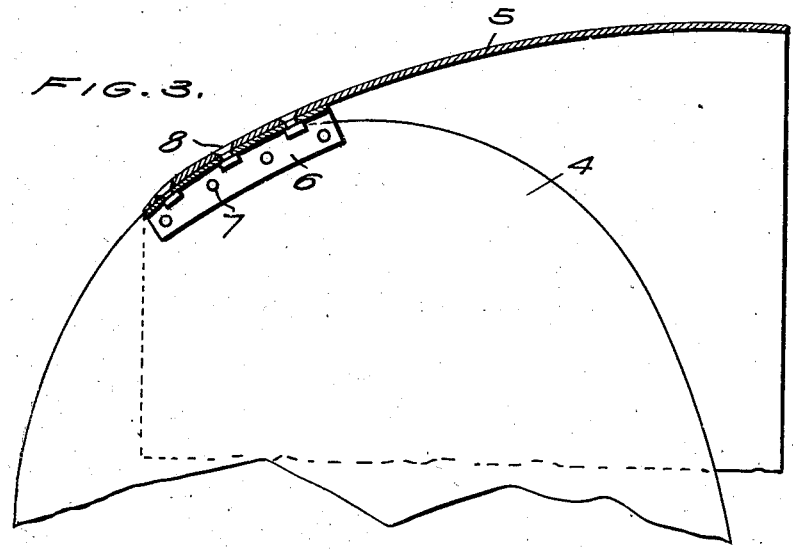
INVENTOR
ROBERT LE GROW WALSH
BY Francis J. L. Vanderworker
and Wade Korty
ATTORNEYS Jan. 8, 1935. R. L. WALSH 1,986,867
AIRPLANE PROPELLER
Filed Feb. 13, 1932 3 Sheets-Sheet 2

INVENTOR
ROBERT LE GROW WALSH
By Francis H. Vanderwerker
and Wade Koontz
ATTORNEYS Jan. 8, 1935.  R. L. WALSH  1,986,867
AIRPLANE PROPELLER
Filed Feb. 13, 1932  3 Sheets-Sheet 3

INVENTOR
ROBERT LE GROW WALSH
BY Francis H. Vanderwerker
and Wade Koontz
ATTORNEYS Patented Jan. 8, 1935

1,986,867

UNITED STATES PATENT OFFICE 1,986,867

AIRPLANE PROPELLER

Robert L. Walsh, Dayton, Ohio

Application February 13, 1932, Serial No. 592,760

3 Claims. (Cl. 170—168)

(Granted under the act of March 3, 1883, as amended April 30, 1928; 370 O. G. 757)

The invention described herein may be manufactured and used by or for the Government for governmental purposes, without the payment to me of any royalty thereon.

This invention has reference to improvements in airplane propellers and the objects of the improvements are to reduce to a minimum the flutter and resultant noise from the propeller and to increase the propulsive reaction or efficiency of the propeller by the employment of a cowl, shroud, ring or brace in combination with the propeller.

Flutter is a form of severe vibration of the propeller blades. It is usually considered a torsional vibration in which the blade angles increase and decrease rapidly, but it may be connected with bending, for fore-and-aft deflections are ordinarily accompanied by a change of angle also. Flutter is accompanied by an unpleasant increase in noise which is sometimes of a rapid hammering nature. It sometimes sets up uncomfortable pulsations in the air for some little distance from the propeller. Both tests and practical experience show that severe flutter is accompanied by a sufficiently great stress, or variation of stress, to cause failure if continued long enough.

According to the invention, the cowl, shroud, or ring, preferably circular, is fastened to the tips or to the outer part of the blades of the air propeller to provide blade-stiffening elements between adjacent blades, which elements function to stiffen the blades against fore-and-aft deflections since the greater part of the propeller noise comes from flutter, particularly the tip vibration, and this cowl, shroud, or ring, having certain rigidness, will tend to dampen and stop the tip flutter. Some noise also results from the use of a straight edge blade cutting or trailing the air but this may be reduced by using a blade with curved leading and trailing edges. For the sake of efficiency and to gain the necessary rigidity, a streamline form of cowling, shroud, or ring, securely fastened at or near the tips of the propeller blades, is preferable.

In addition to its use for the purpose of reducing noise, the cowl or shroud serves to increase the efficiency or propulsive reaction of the propeller by converting into useful energy the air flow at the propeller tip. The present standard air screw type of propeller produces an axial air stream but there is at the same time a centrifugal component which leaves the tip of the propeller blade. By the employment of the cowl or shroud, this centrifugal component instead of being a loss, as at present, is diverted from the tip of the blade along the inside of the cowl or shroud and then along the axial air stream and thus converted into useful propulsive energy or propulsive reaction.

A gain in propulsive efficiency of some ten per cent (10%) is possible when this loss is utilized.

This use of cowling is to be distinguished from the use of a cowling or shroud for another purpose, as when constituting a necessary part of the propeller due to the centrifugal force type of blade action and being, therefore, not an element of a combination but a fundamental part of the propeller design. Even though air flow be considered theoretically as the flow of a fluid such as water, etc., still, due to the viscosity, the propulsive reaction or efficiency cannot be compared under similar conditions. It has been found, for instance, that working in the medium of air with a propeller is not exactly analogous to working with a propeller in the medium of water, as with a boat propeller. The difference of viscosity of the two mediums appears to give different practical results. Also, working in a confined medium, as with a pump, gives other varying results.

It should be understood, therefore, that the present invention has reference to airplane propellers which cannot be considered under the same classification as propellers for use in ship propulsion in water or impellers for pumps, etc., due to the physical differences between air and water. The present invention is based on converting certain flow and lost energy from the propeller tip into useful work, as well as the reduction of noise from flutter.

Primarily, the feature of the invention, relating to increased propulsive efficiency, concerns an efficient propeller for engines now being developed and of a considerable higher horsepower than those at present in general use. True, it is possible to increase the length of the blades but this involves other factors which tend to decrease the general efficiency.

Therefore, the invention contemplates combinations of a propeller with the cowling or shroud rigidly attached thereto in which: First, the blades can be at any angle to the axis of the propeller, second, two or more propellers or staggered blades of one propeller are used, the blades being in different planes perpendicular to the propeller axis or in a conical shape inclined to the propeller axis but staggered to the rear; and, third, blades positioned in tandem may turn in the same direction or in opposite directions with a common or individual cowling, respectively.

The foregoing objects are attained by the novel combination, arrangement, and construction of parts illustrated in the accompanying drawings, in which:—

Fig. 1 is a front elevation of a four-bladed propeller embodying the invention;

Fig. 2 is a side elevation thereof;

Fig. 3 is a detail sectional view on an enlarged scale, illustrating a method of fastening the cowl to the propeller blade, and Figures 4 to 15 inclusive, illustrate various modifications of the invention.

Figure 6:
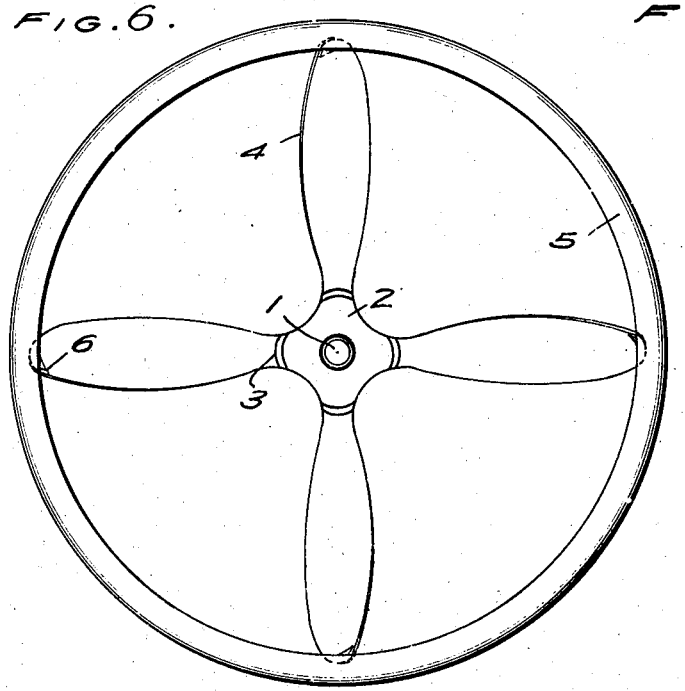

The drawings illustrate combinations utilizing steel or other metal propellers but the invention applies likewise to wooden or other propellers. When the cowling is fixed to the propeller, the difficulties of bracing the same make it preferable to use a propeller of three or four, or more, blades. As engines of higher horsepower are developed, thereby giving a higher speed to the airplane, the number of propeller blades may be increased since the loss due to the interference of one blade with another varies inversely as the speed of the plane. At the same time, for greater efficiency, blades with greater tip area can then be utilized. The invention is not to be considered, therefore, as being limited to a combination of cowl or shroud with such standard types of propeller blades as are now in use since developments should lead to a combination of the cowl or shroud with propeller blades having a much greater tip area.

In the drawings like letters of reference indicate corresponding parts in each figure.

Fixedly mounted on the end of the propeller drive shaft 1 of the motor is the propeller hub 2 to which are attached by means of collars 3, the propeller blades 4. The propeller blades can be secured at or near their outer ends to elements of the cowling 5 by angle braces or other means 6. As shown in Fig. 3, each angle brace extends broadside of the blade to which it is attached and is shaped to conform to the exterior surface of the blade tip and to the interior front surface of the cowl or shroud; one flange of the brace being fastened to a side face of the blade and adjacent the blade tip with rivets 7 and the other flange being fastened to the underside of the front portion of the cowl or shroud with bolts 8. It will be noted from Figure 3 that only the front portion of the cowl has contact with each blade tip and then only from the center of the tip for a short distance forwardly along the leading edge of the tip; the rear portion of the cowl extending progressively away from the tip in an outwardly and rearwardly direction. The propeller blades are, therefore exposed for substantially the full length of their respective curved leading edges and operate in the well known manner to impart a momentum to a column of air, the cross section of which is approximately the area swept out by the rotating blades. This column of air is driven backwards by the propeller, moving parallel to the propeller axis, and is known as the "slipstream". There is, however, a small centrifugal component which leaves the rounded tip of the propeller blade and represents a loss. With a cowling arranged as herein described, the small centrifugal flow is diverted smoothly from the tips along the inner side of the cowling and by reason of the progressive spacing of the cowl from the trailing side of the propeller tips, the diverted air flow passes rapidly to the rear and into the "slipstream" where it is converted into useful propulsive energy. This diverting of the centrifugal component of the "slipstream" back into the axial air stream is thus accomplished in a smooth and rapid manner and without permitting any accumulation of air at or near the propeller tips such as would create a zone of high pressure which, in an aircraft propeller is objectionable and impairs the efficiency of the propeller. The angle brackets are coextensive with the contacting portions of the cowl and blade tips and by reason of their location on the sides of the blade tips they stiffen and reinforce the same laterally or along the attacking edges which are normally subjected to the greatest stresses and which, therefore, have the greatest tendency toward vibration and fore-and-aft deflections. The portions of the cowl bridging the spaces between adjacent blades and connecting the angle brackets stiffen the blade tips circumferentially of the propeller. Hence, the blade tips are stiffened back laterally and longitudinally. Many other means of attachment may also be used.

A curved form of cowling 5 is employed to give a better concentration of the outer portion of the air stream after it leaves the propeller and to utilize the air flow coming from the tip of the propeller and which is otherwise lost. The design of the cowling can be changed to conform to different conditions, as desired. In specific cases it may be desirable to change the form of the cowl or shroud and vary the performance of the plane accordingly. As an example, for greater speed, it may be desirable to reduce the diameter of the trailing edge of the cowl or shroud and thus increase the pressure within the air stream or for greater climb it may be desirable to increase this diameter and allow the air stream to work over a greater area. Expressed otherwise, it would mean that by varying the angle of attack of the cowl or shroud, these conditions would change accordingly. Figures 4 and 5 represent cross sections of two different cowls or shrouds showing that, by varying this cross section, different propulsive reactions can be obtained as to the speed or climb of the airplane. The section X—X' will give a greater climb reaction and the section Y—Y' a greater speed reaction.

Figure 7:
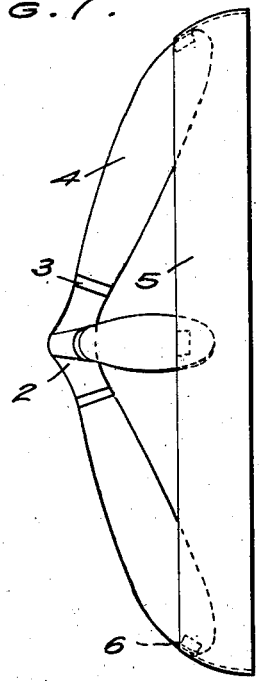

Due to the greater horsepower being developed in airplane engines, and to the desire to avoid excessive tip speeds and also to keep the diameter of the propeller at a minimum consistent with the frontal area of the engine, it may be preferable to set the blades at an angle to the axis of the propeller. Figures 6 and 7 represent the front and side elevations of a combination of propeller and cowl or shroud with the blades of the propeller at an angle to the axis of the propeller. The use of cowling with a propeller whose blades are at an angle to the vertical makes it possible to utilize this type of propeller to advantage.

Figure 8:
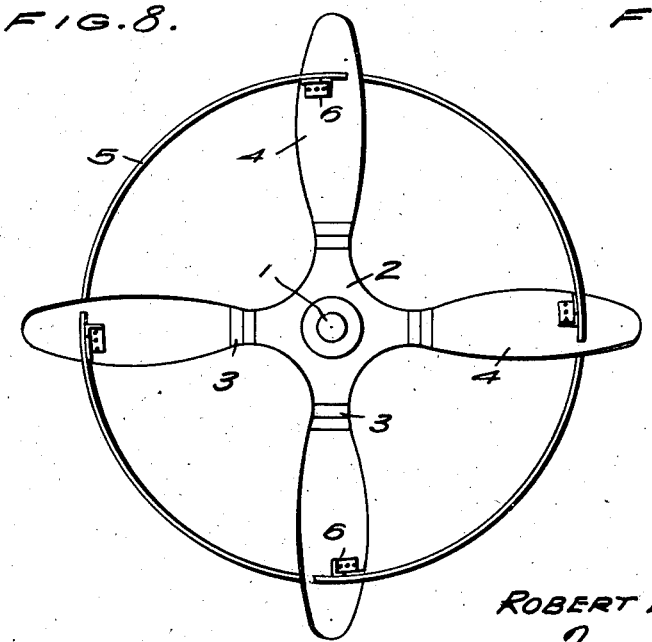
Figure 9:
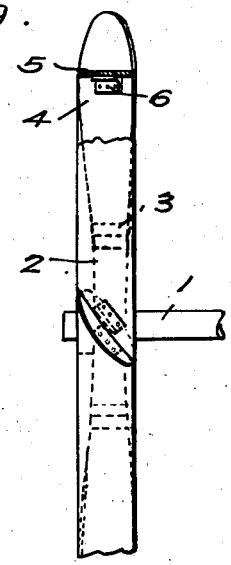
Figure 14:
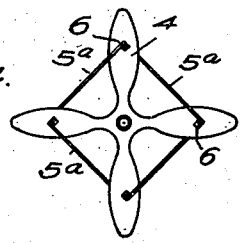
Figure 15:
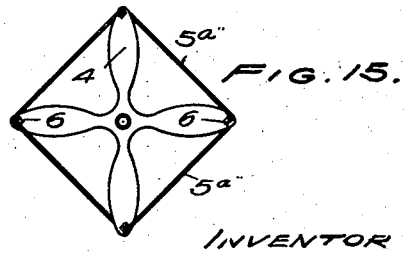

It may be desirable, in some instances, to place the cowl, shroud or ring along the blades rather than at the tip of the blades. This ring or shroud would be so placed as to have the effect of acting at a node and reducing the flutter accordingly. The ring would be of curved form or cross-section and sufficiently rigid to give the desired effect. Figs. 8 and 9 represent the front and side elevations of a combination of propeller with a shroud or ring placed along the blades preferably at points, not at the tips, where as determined by test the best dampening effects are obtained. This arrangement also gives better bracing characteristics by reason of each blade being supported by the flat strips 5 being connected to the opposing faces of adjacent blades so as to brace the same crosswise thereof for substantially their full width and adjacent their tip sections to resist fore-and-aft deflections of the respective blades and adds somewhat to the propulsive reaction since the flat faces of the braces being parallel to the "slipstream" will tend to divert the centrifugal component thereof into the "slipstream". If necessary, instead of having the circular shroud or ring, the bracing could be accomplished and the noise reduced by having straight members 5a between the blades and so placed as to dampen the flutter; such straight members being connected to the side faces of the blades from tip and tip or at corresponding positions along each blade as shown in Figs. 14 and 15.

Figure 10:
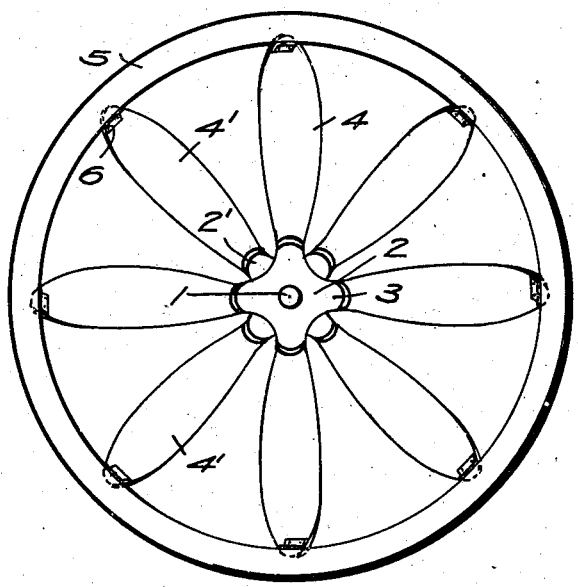
Figure 11:
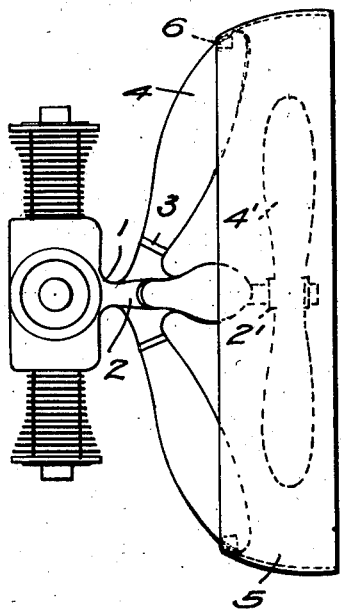

Likewise, it may be desirable to utilize two or more propellers or staggered blades of one propeller, the blades being in different planes perpendicular to the axis of the propeller or in a conical shape inclined to the axis of the propeller but staggered to the rear, and blades so positioned in tandem may turn in the same direction with a common or with individual cowlings or shrouds, respectively. The invention relates accordingly to a combination of such propellers with the corresponding cowlings or shrouds. Figures 10 and 11 represent a combination of two propellers and cowl or shroud. The blades 4 of the first propeller are at an angle to the propeller axis and the blades 4' of the second propeller are vertical to the axis. The second propeller constitutes a booster propeller and has its blades 4' staggered with respect to the blades 4 of the front or main propeller; the blades 4' being attached to a hub 2' on the propeller drive shaft 1.

Figure 12:
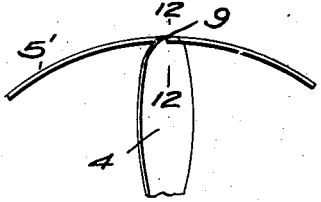
Figure 13:
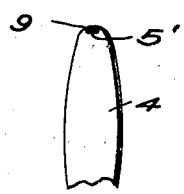

In the modification disclosed in Figs. 12 and 13, a ring 5' of very small cross section is utilized to dampen the noise of the propeller without regard to gaining the benefits from diverting the tip loss to the axial air stream. The ring is fastened to the tips of the propeller blades by suitable means so as to be centered between the leading and trailing edges of the blades as shown at 9.

From the foregoing, it is apparent that, through the use of cowling in combination with and attached to the tip part of the propeller blades by connection with the side faces of the blades, the flutter or tendency to fore-and-aft deflection of the propeller blade-tips with its resultant noise is considerably reduced and since the tip part of each blade is in direct contact with the cowling rather than in contact with the air, there is, therefore, no abrupt blow or impact of the blade tip against the air or of the air leaving the tip. The air flow goes from the tip of the blade to the cowling and then passes smoothly to the rear, being diverted into propulsive use, whereas standard propellers as now used without cowling do not utilize to advantage all of the air flow from the propeller tip.

Having thus described the invention, what is claimed is:—

1. The combination with an aircraft propeller, having propeller blades with curved leading edges and rounded tips, of a bracing cowl encircling the propeller at the tips of the propeller blades and extending rearwardly of the trailing edges of the blades, said bracing cowl being curved transversely and having contact with each rounded blade tip only for a short distance along the curved upper leading edge, and rigid connections between the blade tips and the encircling cowl uniting the same along their points of contacts to stiffen the blade tips against fore-and-aft deflections.

2. The combination with an aircraft propeller having a plurality of propeller blades, of a blade stiffening annulus connecting the blades to stiffen the same against fore-and-aft deflections, said annulus being composed of separate flat faced rigid strips respectively disposed inwardly between opposing side surfaces of adjacent blades and secured thereto at corresponding points with their flat faces parallel to the axis of the propeller, said strips being disposed inwardly of the leading and trailing edges of the propeller blades.

3. In an aircraft propelling unit, the combination with a conventional aircraft propeller of a ring cowl having a cambered inner surface and encircling the propeller at the tips of the propeller blades for intercepting and diverting back into the axial airstream of the propeller the small centrifugal component of the slipstream which normally leaves the tip of each blade and represents a loss in usual propulsive energy, said ring cowl being fixedly supported on the top edge of each blade so that only a front portion of the cowl is fixed to and has contact with each blade tip and then only from the center of the tip for a short distance forwardly along the leading edge of the tip so that the propeller blades are exposed for substantially the full length of their respective leading edges, the said cowl extending from the point of fixture with each blade progressively away from the tip of the blade in an outwardly and rearwardly direction beyond the trailing side of the blades for conducting the diverted air flow to the rear and into the slipstream in a smooth and rapid manner and without permitting any accumulation of air at or near the propeller tip such as would create a zone of high pressure impairing the efficiency of the propeller.

ROBERT L. WALSH.